(12) United States Patent
Hanebuth et al.

(10) Patent No.: US 10,166,625 B2
(45) Date of Patent: Jan. 1, 2019

(54) TORCH FOR TUNGSTEN INERT GAS WELDING

(71) Applicant: Siemens Aktiengesellschaft, Munich (DE)

(72) Inventors: Henning Hanebuth, Pliening OT Gelting (DE); Christian Werner, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 589 days.

(21) Appl. No.: 14/417,156

(22) PCT Filed: Jul. 26, 2013

(86) PCT No.: PCT/EP2013/065825
§ 371 (c)(1),
(2) Date: Jan. 25, 2015

(87) PCT Pub. No.: WO2014/019958
PCT Pub. Date: Feb. 6, 2014

(65) Prior Publication Data
US 2015/0246409 A1 Sep. 3, 2015

(30) Foreign Application Priority Data
Jul. 31, 2012 (DE) ........................ 10 2012 213 453

(51) Int. Cl.
*B23K 9/28* (2006.01)
*B23K 9/167* (2006.01)
(Continued)

(52) U.S. Cl.
CPC ............ *B23K 9/285* (2013.01); *B23K 9/0213* (2013.01); *B23K 9/167* (2013.01); *B23K 9/296* (2013.01)

(58) Field of Classification Search
None
See application file for complete search history.

(56) References Cited

U.S. PATENT DOCUMENTS 2,813,193 A * 11/1957 Bichsel ................. B23K 9/291
219/137.44
3,836,747 A * 9/1974 Wlos ...................... B23K 9/291
174/46
(Continued)

FOREIGN PATENT DOCUMENTS

CN 201552375 U 8/2010
CN 201881040 U 6/2011
(Continued)

*Primary Examiner* — Ibrahime A Abraham
*Assistant Examiner* — Gyounghyun Bae
(74) *Attorney, Agent, or Firm* — Beusse Wolter Sanks & Maire

(57) ABSTRACT

A torch for tungsten inert gas welding is provided, in particular a narrow gap head for tungsten inert gas narrow-gap welding. In a housing made of metal, an electrode unit is retained by an electrode retainer and a cooling device for cooling the electrode unit is present. Liquid cooling medium can be conducted into the electrode retainer and back out of the electrode retainer through the cooling device. The cooling device includes at least one electrically conductive partition within a jacket of the electrode retainer for forming cooling channels, at least the at least one partition being electrically connected to the electrode unit. Furthermore, an outer surface of the electrode retainer is provided with an insulating layer at least in the area of the housing, which housing surrounds the electrode retainer.

16 Claims, 3 Drawing Sheets

(51) Int. Cl.
 *B23K 9/29* (2006.01)
 *B23K 9/02* (2006.01)

(56) References Cited

U.S. PATENT DOCUMENTS

| | | | | |
|---|---|---|---|---|
| 4,621,183 | A * | 11/1986 | Takeuchi | B23K 9/046 219/121.47 |
| 4,655,280 | A * | 4/1987 | Takahashi | B29C 33/04 164/348 |
| 4,667,083 | A * | 5/1987 | Stol | B23K 9/295 219/136 |
| 4,817,053 | A | 3/1989 | Ikeda et al. | |
| 5,206,481 | A * | 4/1993 | Rossner | H05H 1/34 219/121.48 |
| 5,258,599 | A * | 11/1993 | Moerke | B23K 9/295 219/121.45 |
| 5,313,046 | A * | 5/1994 | Zamuner | B23K 9/295 219/137.62 |
| 5,403,987 | A * | 4/1995 | Rehrig | B23K 9/296 219/137.51 |
| 5,611,951 | A * | 3/1997 | Kunz | B23K 9/173 219/137.62 |
| 6,211,490 | B1 * | 4/2001 | Nosse | B23K 9/173 219/137.62 |
| 7,064,301 | B2 * | 6/2006 | Han | F24H 3/0405 219/202 |
| 2002/0118984 | A1 * | 8/2002 | Lee | H05B 3/0095 399/330 |
| 2002/0174979 | A1 * | 11/2002 | Haegele | F28D 1/0391 165/177 |
| 2003/0173339 | A1 * | 9/2003 | Fryer | H05H 1/34 219/121.5 |
| 2004/0250939 | A1 * | 12/2004 | Konishi | B29C 65/18 156/60 |
| 2005/0029234 | A1 * | 2/2005 | Lu | B23K 11/3009 219/119 |
| 2005/0082263 | A1 * | 4/2005 | Koike | H05H 1/28 219/121.49 |
| 2007/0045245 | A1 * | 3/2007 | Brandt | H05H 1/28 219/121.49 |
| 2007/0102344 | A1 * | 5/2007 | Konrad | B01L 3/50215 210/455 |
| 2009/0288676 | A1 * | 11/2009 | Shim | A45D 4/12 132/269 |
| 2010/0155373 | A1 * | 6/2010 | Yamaguchi | H05H 1/34 219/121.5 |
| 2010/0224597 | A1 * | 9/2010 | Keller | B23K 9/0213 219/75 |
| 2010/0252536 | A1 * | 10/2010 | Spencer | B23K 11/3009 219/119 |
| 2011/0240609 | A1 * | 10/2011 | Jehnert | H05H 1/34 219/121.52 |
| 2011/0259855 | A1 * | 10/2011 | Yang | H05H 1/28 219/121.5 |
| 2013/0248535 | A1 * | 9/2013 | Wolfe | B65D 25/04 220/500 |

FOREIGN PATENT DOCUMENTS

| | | |
|---|---|---|
| DE | 2732756 A1 | 2/1979 |
| DE | 102009008250 A1 | 8/2010 |
| EP | 2008750 A1 | 12/2008 |
| EP | 2366485 A1 | 9/2011 |
| JP | S51144593 | 12/1976 |
| JP | S5666388 A | 6/1981 |
| JP | S6318541 A | 1/1988 |
| JP | S63248539 A | 10/1988 |
| JP | H07276050 A | 10/1995 |
| JP | H09206947 A | 8/1997 |
| JP | 2000024780 A | 1/2000 |

* cited by examiner

TORCH FOR TUNGSTEN INERT GAS WELDING

CROSS REFERENCE TO RELATED APPLICATIONS

This application is the U.S. National Stage of International Application No. PCT/EP2013/065825 filed 26 Jul. 2013, and claims the benefit thereof. The International Application claims the benefit of German Application No. DE 102012213453.0 filed 31 Jul. 2012. All of the applications are incorporated by reference herein in their entirety.

FIELD OF INVENTION

The invention relates to a torch for tungsten inert gas welding. The invention relates in particular to a narrow-gap head for tungsten inert gas narrow-gap welding.

BACKGROUND OF INVENTION

In tungsten inert gas welding torches, an arc burns between a non-consuming tungsten electrode and a workpiece. The electrode is usually connected as a cathode. Since the emission of electrons as free charge carriers is achieved mainly by high temperatures, it is desired to achieve high power densities in the electrode. This can be achieved by a conical cone-shaped form of the tungsten electrode. It is also desired that the starting point of the arc lies as close as possible in the direction of the workpiece, which is assisted by the conical form of the electrode tip. For the high temperatures occurring at the electrode, cooling is required, in order to prevent or at least limit its wear.

Usually, an inert gas is passed through the torch in the direction of the workpiece. For this there is an inert gas nozzle. This nozzle allows the inert gas to be formed as a closed veil around the arc. The inert gas nozzle thereby encloses the electrode and is arranged alongside it.

DE 10 2009 008 250 A1 discloses a torch for tungsten inert gas welding in which an electrode unit is held in a housing made of a metal by means of an electrode holder. For cooling the electrode unit, there is a cooling device, by which liquid cooling medium can be conducted into the electrode holder and out of it again. For this purpose, in the electrode holder there is formed a cavity, in which the cooling medium can be conducted into this cavity and out of it again via a cooling tube. After leaving the cooling tube, the cooling medium can impinge directly on the end face of the electrode unit. In this way, direct cooling of the electrode unit is achieved.

SUMMARY OF INVENTION

An object of the invention is to provide a torch for tungsten inert gas welding, in particular a narrow-gap head for tungsten inert gas narrow-gap welding, that can be used with high electrical current intensities and great welding reliability.

This object is achieved by a torch and by an electrode holder according to the features of the independent claims. Advantageous embodiments and developments of the invention are presented in the dependent patent claims.

In the case of a torch according to the invention for tungsten inert gas welding, in particular a narrow-gap head for tungsten inert gas narrow-gap welding, an electrode unit is held in a housing made of a metal by an electrode holder and there is a cooling device for cooling the electrode unit. By the cooling device, liquid cooling medium can be conducted into the electrode holder and out of it again.

The cooling device comprises at least one electrically conductive separating wall within a shell of the electrode holder for forming cooling channels. In this case, at least the at least one separating wall, possibly also the shell of the electrode holder, is electrically connected to the electrode unit. At the same time, an outer surface of the electrode holder is provided with an insulating layer, at least in the region of the housing surrounding the electrode holder.

The current transfer can be conducted not only through the shell, as is the case with conventional torches, but additionally via the components belonging to the cooling device, so that an increased effective cross section for carrying the current is provided. This allows comparatively higher currents to be transferred to the electrode unit. At the same time, all of the current-conducting components are in contact with the cooling medium, so that efficient heat removal is achieved by direct cooling of the electrode unit.

On account of the insulating layer, the proposed configuration also makes an electrical isolation of the electrode holder from the housing possible. As a result, a complete current flow through the electrode holder is achieved. The insulating layer not only makes an exclusive transfer of the welding current via the electrode holder possible, but also makes it possible to use the torch in situations in which there are small distances between the housing and a workpiece to be worked. This may be for example what is known as a narrow gap, in which the torch is guided for producing a weld seam. The fact that the housing is free from current means that there also cannot be any arcs in the narrow gap between the housing and the workpiece to be worked, thereby reducing the risk of the housing or workpiece being destroyed.

In an expedient configuration, the shell of the electrode holder is formed by a cylinder made of a metal, in particular of copper or of high-grade steel or alloys thereof. Since a large part of the current can be conducted via the separating wall of the cooling device to the electrode unit, it is not necessary that the shell of the electrode holder, which is likewise part of the cooling device, is formed from a material with the best possible conduction, such as for example copper. Instead, high-grade steel, which is a material that is less expensive and can be worked better, or an alloy thereof may be used.

For forming the cooling channels, it is expedient if the shell and the at least one separating wall of the electrode holder are connected to one another in a form-fitting manner.

In order to make a high current-carrying capacity of the torch or electrode holder possible, the at least one separating wall is advantageously formed from copper. In addition, the number of separating walls can not only dictate the number of channels for conducting the cooling medium, but also allow the cross section that is available for conducting the current to be varied in a suitable way.

In a further configuration, the at least one separating wall goes over at the end of the shell that is facing the workpiece to be worked into a closure element, which is connected to the shell in a fluid-tight manner. The fluid-tight connection may be established for example by a welding operation. Similarly, the closure element may be screwed or pressed together with the shell. If necessary, additional encapsulating material or a solder may be used to establish the tightness of the seal.

It is also expedient if the at least one separating wall has in the region of the closure element at least one clearance, through which the cooling channels are connected to one another, so that the liquid cooling medium can flow into the electrode holder and in the direction of the closure element through at least one cooling channel and away from the closure element and out of the electrode holder through at least one other cooling channel. A "deflection" of the cooling medium takes place in the region of the clearance in the separating wall.

The separating wall may be optionally formed by a planar web or a single- or multi-start worm. A planar web has the advantage that it can be easily produced. The planar web separates the shell for example into two halves of equal size, the deflection taking place in the region of the clearance(s) in the region of the closure element. More homogeneous cooling can be achieved by a volute separating wall, since, as a result of the spiral-shaped cooling channel, the "cold" cooling medium flowing in the direction of the closure element makes it possible for the electrode holder, in particular its shell, to be cooled on all sides.

The insulating layer may optionally comprise a heat-resistant plastic or ceramic. It is sufficient if it has a thickness of about 0.1 to 0.3 mm.

The electrode unit is advantageously formed with at least two parts, an electrode of tungsten or tungsten alloy that tapers conically in the direction of a workpiece being fixed in a force-fitting and/or material-bonding and/or form-fitting manner in an electrode carrier of a metal with a thermal conductivity greater than 50 W/mK. Steel has a thermal conductivity of 52 W/mK; aluminum has a thermal conductivity of 270 W/mK. The force-fitting and/or material-bonding fixing of the electrode in the electrode carrier allows low contact resistances to be realized, so that the risk of instances of local overheating in this region is low.

The fact that, according to a further configuration, the electrode unit is detachably screwed to the electrode holder means that the electrode unit can be detached from the electrode holder and replaced by another electrode unit according to requirements without encountering any problems. This is advisable for example whenever an electrode with a different diameter or different form is to be used. Similarly, an exchange of the electrode unit may take place in the case of wear, simply by unscrewing the electrode unit, removed from the electrode holder, and inserting a new electrode unit.

In particular, here the electrode unit is detachably screwed directly to the closure element of the electrode holder. For this purpose, the closure element has for example a bore with an internal thread, into which a corresponding projection, provided with an external thread, of the electrode carrier can be screwed. Similarly, the electrode carrier may comprise a bore with an internal thread and the closure element may have a projection with an external thread. The screw connection between the closure element and the electrode unit additionally represents a low-resistance connection.

It is also expedient that the housing is flat, its width being much less than a length, the length being the extent of the housing in the direction of a welding track. For example, the housing may be formed as a flat piece. Such a housing is also referred to as a blade. The width of such a blade is generally just sufficient to allow the electrode holder to be stably received in it. Appropriate lines for feeding in the inert gas are provided in the blade on opposite sides of the electrode holder. The inert gas is in this case led out from two opposite sides in the direction of the electrode, in order to form a veil around the arc between the electrode and the workpiece.

The housing has a bore for receiving the electrode holder, the electrode holder being received with a loose fit. This makes it possible that the electrode holder can be easily turned in the housing, so that the electrode can perform an oscillating movement, as is often used for example in the case of narrow-gap welding.

The fact that there is an electrical isolation between the housing and the electrode holder on account of the insulating layer applied to the electrode holder means that the housing need not have any insulation, in particular any outside insulation. Even when the metallic housing is in contact with the workpiece, no fusion between these two components can occur here, since the housing does not conduct current.

The invention also provides an electrode holder for a torch of the type described above that holds an electrode unit and comprises a cooling device for cooling the electrode unit, by which liquid cooling medium can be conducted into the electrode holder and conducted out of the electrode holder again. The cooling device comprises at least one electrically conductive separating wall within a shell of the electrode holder for forming cooling channels, at least the at least one separating wall being electrically connected to the electrode unit. An outer surface of the electrode holder is provided with an insulating layer, at least in the region of the housing surrounding the electrode holder. The electrode holder likewise has the advantages described above.

BRIEF DESCRIPTION OF THE DRAWINGS

The invention is explained in more detail below on the basis of exemplary embodiments in the drawing, in which.

DETAILED DESCRIPTION OF INVENTION

Figure 1:
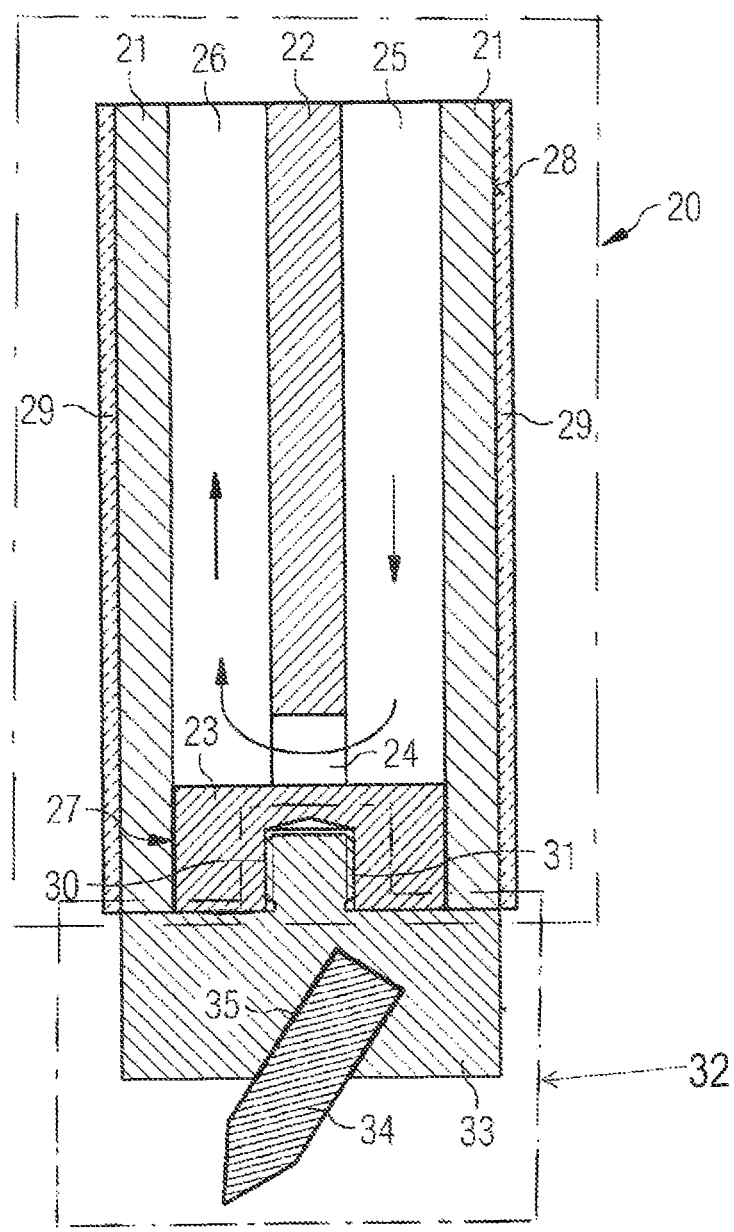
FIG. 1 shows a sectional representation of an electrode holder according to the invention for tungsten inert gas welding.
Figure 2:
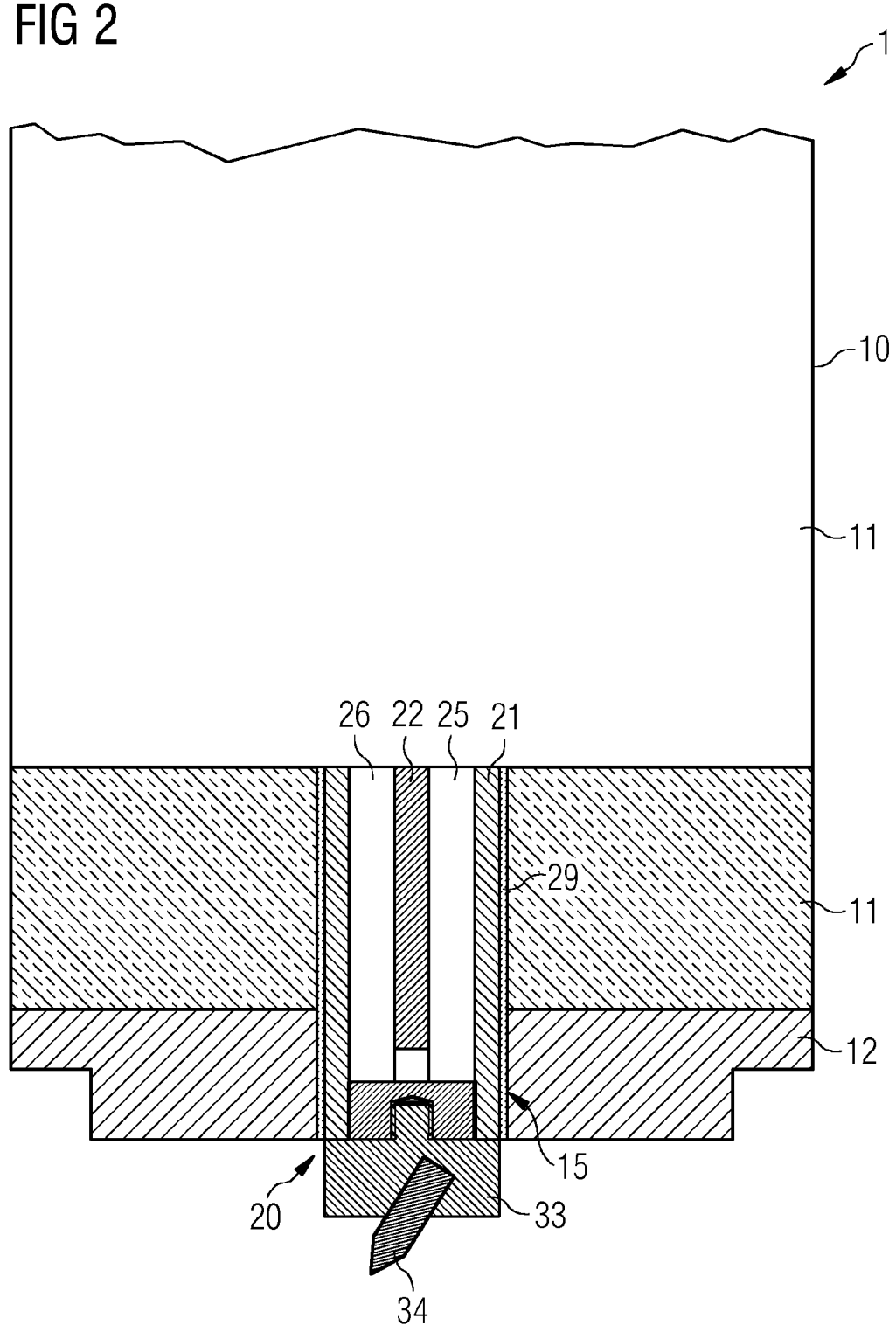
FIG. 2 shows a partially sectional view of a torch according to the invention in the form of a narrow-gap head for tungsten inert gas narrow-gap welding.

FIG. 1 shows in a cross-sectional representation an electrode holder 20 according to the invention for a torch in the form of a narrow-gap head for tungsten inert gas narrow-gap welding. The torch formed as a narrow-gap head is represented in FIG. 2 in a partial cross-sectional representation.

The electrode holder 20 comprises a cross-sectionally cylindrical, hollow shell 21, which may optionally comprise copper or high-grade steel. The use of high-grade steel makes easier and less costly production of the shell 21 possible. Arranged inside the shell 21 is a web-shaped separating wall 22, advantageously of copper. The separating wall 22 goes over at its lower end in the figure, which is facing a workpiece that is not represented, into a closure element 23, which closes the cavity of the shell 21. The separating wall 22 and the closure element 23 are advantageously formed in one piece.

Between the closure element 23 and the shell 21 there is formed a fluid-tight connection 27. Such a fluid-tight connection may be established by a welding operation, a screwing operation or an encapsulating operation. A combination of the measures described above may possibly also take place.

In the region in which the separating wall 22 adjoins the closure element 23, the separating wall has at least one clearance 24. This allows cooling channels 25, 26 that are formed between the separating wall 22 and the shell 21 to be connected to one another. For example, cooling medium that flows into the cooling channel 25 can flow through the clearance 24 and out of the electrode holder 20 again through the cooling channel 26. Water may be used for example as the cooling medium.

Connected to the closure element 23 is an electrode unit 32. The electrode unit 32 comprises an electrode carrier 33 and also an electrode 34 connected to the latter. The electrode carrier comprises, for example, a tungsten-copper alloy, for example WCu 80/20. By contrast, the electrode 34 advantageously comprises pure tungsten or is doped with rare earth (elements). As can be readily seen from the cross-sectional representation of FIG. 1, the electrode 34 is inclined here at a predetermined angle with respect to a longitudinal axis of the electrode holder that extends from top to bottom in the direction of the page. The electrode 34 is inserted here in a corresponding bore 35 of the electrode holder 33 and connected to it in a material-bonding manner. The material-bonding connection between the electrode 34 and the electrode carrier 33 may have been established by a soldering operation or by pressing the electrode into the electrode carrier 33.

The connection between the electrode carrier and the closure element 23 advantageously takes place by a screwing operation. For this purpose, the closure element 23 has a bore 30 with an internal thread 31, into which a corresponding projection with an external thread of the electrode carrier 33 has been screwed. This allows for example the diameter of the electrode 34 to be varied in the course of a welding process, in that the electrode unit is replaced by a corresponding other electrode unit with a desired electrode.

Figure 3:
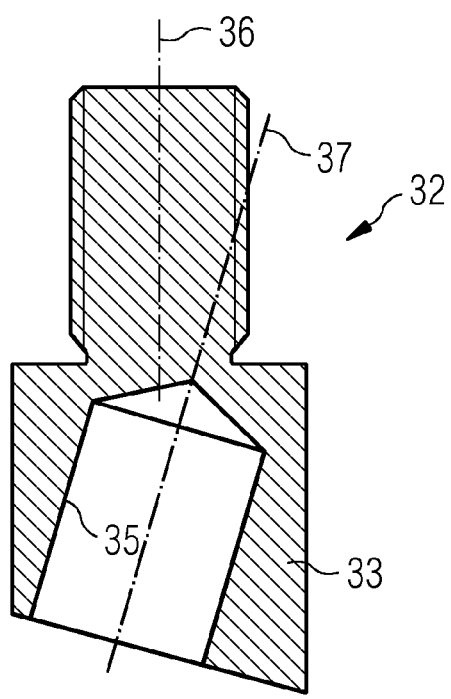
FIG. 3 shows a sectional representation of an electrode unit.

FIG. 3 shows the electrode carrier 33 of the electrode unit 32 without an inserted electrode in an enlarged representation. It can be seen well here that an axis 37 of the bore 35 for receiving the electrode (not represented here) is inclined by a predetermined angle with respect to the longitudinal axis of the electrode holder 20. A projection with an external thread for screwing into the closure element 23 of the separating wall 22 is similarly evident.

As can be seen from FIG. 1, the diameter of the electrode carrier 33 corresponds as a maximum to the outside diameter of the shell 21.

In addition, an insulating layer 29 has been applied to an outer surface 28 of the electrically conducting shell 21. The insulating layer may be formed from a plastics material or a ceramic. This layer is applied to the outer side in a thickness of about 0.1 to 0.3 mm.

Through the hollow shell 21 and the separating wall 22 arranged therein with the clearance 24, a cooling device for cooling the electrode unit 32 is provided by the electrode holder 20. This active, primary cooling of the electrode makes it possible for the welding current to be raised by up to 30%, which can be reflected in an increased welding speed. In addition, there is greatly reduced wear of the electrode unit, and in particular of the electrode.

The primary, active cooling of the electrode unit 32 is also so efficient because direct cooling of the components conducting the welding current takes place, i.e. the separating wall, the closure element 23 and its shell. The cross section that is required or needed for conducting the current can be influenced in a desired way by the configuration of the dimensions, in particular the wall thickness of the shell 21 and the thickness of the separating wall 22.

FIG. 2 shows the electrode holder 20 from FIG. 1 in a housing 10. The electrode holder 20 is arranged with a loose fit in a bore of the housing 10. The housing 10 has the form of a flat piece, the longitudinal extent of the housing 10 being evident in the representation of FIG. 2. This means that the housing 10 with the electrode holder 20 arranged in it is guided in a movement from left to right, or vice versa, for producing the welding track. In this case, the housing 10 is guided in a gap between two workpieces to be joined. The width of the housing 10, extending perpendicularly to the plane of the page, is much less than the length that is evident in FIG. 2. The width of the housing 10 is only a little less than the gap in which the torch 1 is guided during the welding operation.

The housing 10 comprises a blade 11 and what is known as a bar 12. The blade 11 and the bar 12 are electrically isolated from the electrode holder 20 on account of the insulating layer 29 applied to the outer surface 28 of the electrode holder 20.

This means that, by contrast with conventional narrow-gap heads, the housing 10 does not contribute anything to the current flow through the electrode 34. For this reason, the blade 11 can be formed from inexpensive brass. The bar 12 comprises copper, brass or a ceramic, such as for example silicon carbide (SiC) or silicon nitrite (SiN).

In a way known to a person skilled in the art, in the blade 11 there are likewise cooling lines. For this purpose, corresponding bores (not represented) are incorporated in the blade. Similarly provided, for feeding in inert gas, are further bores, which also extend through the bar, in order for the electrode 34 to be flowed around by the inert gas from opposite sides. Since these are known to a person skilled in the art, they are likewise not represented.

Additionally connected to the blade is a connection unit (not represented), which is known to a person skilled in the art and via which current necessary for the welding can be fed to the electrode holder 20. Similarly, the connection unit has connections for feeding in and discharging the cooling medium and also for feeding in the inert gas.

In a variant of an embodiment that is not represented, instead of the straight separating wall 22 a volute separation of the cooling channels 25, 26 may also be provided. For this purpose, the separating wall is formed as a single- or multi-start worm. This allows cooling of the shell 21 of the electrode holder 20 that is uniform over the circumference to be made possible.

The narrow-gap head proposed in the figures consequently has primary cooling of the electrode. The electrode holder comprises a hollow profile that has well-conducting internals (a planar or volute separating wall), which are used in addition to the shell for current transfer. Similarly, the current transfer may possibly take place exclusively via the separating wall. The material-bonding connection of the electrodes to the electrode carrier has the effect of improved contact for the heat dissipation of the cooling device. The electrode carrier is advantageously screwed into the closure element of the electrode holder and then allows a high degree of heat dissipation. In addition, there is a high degree of flexibility with respect to the electrodes that can be used.

The electrical insulation applied to the electrode holder has the effect that the conduction of the welding current takes place exclusively via the electrode holder. Consequently, the housing in the form of the blade and the bar is electrically isolated from the electrode holder. Independently of the cooling of the electrode holder, cooling of the housing, in particular of the blade, may be provided.

The primary cooling of the electrode leads to a raising of the welding current, which is reflected in an increased welding speed. Further advantages lie in greatly reduced wear of the electrode holder in connection with the blade and also greatly reduced wear of the electrode. As a consequence of the electrical isolation of the blade and the electrode holder, no problems arise with regard to the destruction of the blade when there is contact of the workpiece to be worked with the blade. Fusing of the front bar can likewise be avoided in this way.

Furthermore, parts costs can be lowered, since the blade, but also the front bar, can be produced from inexpensive brass instead of the expensive tungsten-copper previously used. Similarly, the use of a ceramic is possible.

The improved cooling of the electrode leads technologically to a concentration of the plasma attachment point on the electrode tip, to a stabilization of the plasma, to a reduced evaporation rate of the doping elements, and consequently altogether to a more stable arc, whereby the welding result is improved.

The invention claimed is:

1. A torch for tungsten inert gas welding, comprising:
    a housing,
    an electrode holder disposed in the housing,
    an electrode unit held in the housing and made of a metal, and
    a cooling device configured to cool the electrode unit, by which a liquid cooling medium can be conducted into the electrode holder and conducted out of the electrode holder again,
    wherein the cooling device comprises at least one electrically conductive separating wall disposed within a shell of the electrode holder for forming cooling channels, at least the at least one electrically conductive separating wall being electrically connected to the electrode unit,
    wherein an insulating layer is disposed between the housing and the electrode holder, and
    wherein the at least one electrically conductive separating wall comprises at least one clearance, through which the cooling channels are connected to one another, so that the liquid cooling medium can flow into the electrode holder and in a direction of the electrode unit through at least one cooling channel and away from the electrode unit and out of the electrode holder through at least one other cooling channel.

2. The torch as claimed in claim 1,
    wherein the shell of the electrode holder comprises a cylindrical shape and comprises a metal.

3. The torch as claimed in claim 1,
    wherein the shell and the at least one electrically conductive separating wall of the electrode holder are connected to one another in a form-fitting manner.

4. The torch as claimed in claim 1,
    wherein the at least one electrically conductive separating wall comprises copper.

5. The torch as claimed in claim 1, further comprising:
    a closure element that is connected to a lower end of the shell in a fluid-tight manner and to which the electrode unit is secured,
    wherein a lower end of the at least one electrically conductive separating wall is positioned over the closure element.

6. The torch as claimed in claim 1,
    wherein the at least one electrically conductive separating wall comprises a shape of a planar web or a single-start or multi-start worm.

7. The torch as claimed in claim 1,
    wherein the insulating layer comprises a heat-resistant plastic or a ceramic.

8. The torch as claimed in claim 1,
    wherein the electrode unit comprises an electrode carrier and an electrode, the electrode comprising tungsten or tungsten alloy that tapers conically in a direction of a workpiece and which is fixed in a force-fitting and/or material-bonding and/or form-fitting manner in the electrode carrier which comprises a metal with a thermal conductivity greater than 50 W/mK.

9. The torch as claimed in claim 1,
    wherein the electrode unit is detachably screwed to the electrode holder.

10. The torch as claimed in claim 1, further comprising:
    a closure element that is connected to a lower end of the shell and to which the electrode unit is secured,
    wherein the electrode unit is detachably screwed directly to the closure element of the electrode holder.

11. The torch as claimed in claim 1,
    wherein the housing is flat and comprises a length and a width that is much less than the length, the length being an extent of the housing in a direction of a welding track.

12. The torch as claimed in claim 1,
    wherein the housing comprises a bore configured to receive the electrode holder with a loose fit.

13. The torch as claimed in claim 1,
    wherein the housing is free of any insulation on an external surface of the housing.

14. The torch as claimed in claim 1,
    wherein the torch comprises a narrow-gap head for tungsten inert gas narrow-gap welding.

15. The torch as claimed in claim 1,
    wherein the shell of the electrode holder comprises a cylindrical shape and comprises copper or high-grade steel or alloys thereof.

16. An electrode holder for a torch for tungsten inert gas welding, comprising:
    an electrode unit comprising an electrode carrier and an electrode disposed in the electrode carrier,
    a cooling device configured to cool the electrode unit, by which a liquid cooling medium can be conducted into the electrode holder and conducted out of the electrode holder again,
    wherein the cooling device comprises at least one electrically conductive separating wall disposed within a shell of the electrode holder configured to form cooling channels, at least the at least one electrically conductive separating wall being electrically connected to the electrode unit,
    wherein an insulating layer is disposed an outer surface of the electrode holder and is configured to electrically insulate the electrode holder from a housing configured to surround the electrode holder, and
    wherein the at least one electrically conductive separating wall comprises at least one clearance, through which the cooling channels are connected to one another, so that the liquid cooling medium can flow into the electrode holder and in a direction of the electrode unit through at least one cooling channel and away from the electrode unit and out of the electrode holder through at least one other cooling channel.

* * * * *